(12) United States Patent
Dimitroff

(10) Patent No.: US 10,557,587 B2
(45) Date of Patent: Feb. 11, 2020

(54) PIPE REPLACEMENT TOOL AND METHOD

(71) Applicant: Ted R. Dimitroff, Columbia, MO (US)

(72) Inventor: Ted R. Dimitroff, Columbia, MO (US)

( * ) Notice: Subject to any disclaimer, the term of this patent is extended or adjusted under 35 U.S.C. 154(b) by 0 days.

(21) Appl. No.: 16/161,768

(22) Filed: Oct. 16, 2018

(65) Prior Publication Data

US 2019/0113169 A1 Apr. 18, 2019

Related U.S. Application Data

(60) Provisional application No. 62/572,772, filed on Oct. 16, 2017.

(51) Int. Cl.
*F16L 55/165* (2006.01)
*E21B 7/30* (2006.01)

(52) U.S. Cl.
CPC ............ *F16L 55/1658* (2013.01); *E21B 7/30* (2013.01)

(58) Field of Classification Search
CPC ... F16L 55/1658; F16L 55/16455; F16L 1/00; B09B 3/0066
See application file for complete search history.

(56) References Cited

U.S. PATENT DOCUMENTS

| | | | | |
|---|---|---|---|---|
| 4,930,542 A | * | 6/1990 | Winkle | E21B 7/30 138/97 |
| 5,112,158 A | * | 5/1992 | McConnell | E21B 7/30 166/55 |
| 5,544,977 A | * | 8/1996 | Cravy | E21B 7/30 166/55 |
| 5,580,188 A | * | 12/1996 | Nowak | E21B 7/28 405/156 |
| 5,628,585 A | * | 5/1997 | Parish, II | E03F 3/06 175/53 |
| 6,732,816 B2 | | 5/2004 | Dimitroff | |
| 7,581,600 B1 | | 9/2009 | Dimitroff | |
| 8,641,326 B2 | | 2/2014 | Dimitroff | |

* cited by examiner

*Primary Examiner* — Carib A Oquendo
(74) *Attorney, Agent, or Firm* — McKee, Voorhees & Sease, PLC

(57) ABSTRACT

A tool with a rotatable guide head and a rotatable reamer head is pulled through old asbestos-containing pipe to break up the pipe. Liquid is supplied through a shaft between the guide head and reamer head so as to form a slurry mixture with the broken pipe. The slurry is removed through vertical bored relief holes. A drying compound is added to the slurry, which then hardens for easy disposal of the solidified waste material.

20 Claims, 2 Drawing Sheets

PIPE REPLACEMENT TOOL AND METHOD

CROSS-REFERENCE TO RELATED APPLICATIONS

This application claims priority to Provisional Application U.S. Ser. No. 62/572,772, filed on Oct. 16, 2017, which is herein incorporated by reference in its entirety.

FIELD OF THE INVENTION

The invention is directed toward underground pipe replacement, and particularly replacement of asbestos-containing pipes, and a method of safely disposing of the hazardous pipe material in accordance with government regulations.

BACKGROUND OF THE INVENTION

Old underground pipes sometimes must be removed and replaced with new pipes. Some old pipes contain asbestos, which requires special handling for removal. Removal of pipe, such as asbestos cement, creates health risks, since the asbestos may become airborne, and can flow into the soil and/or water table. The Environmental Protection Agency requires that such asbestos-containing pipes can only be removed by digging a ditch, manually picking up sections or pieces of pipe and placing it in a plastic bag or container, and then taking the bagged material to a hazardous waste disposal site. The alternative to the EPA regulations is to leave the pipe in the ground, which still has potential for soil and water contamination, while depreciating property values for the owners.

Therefore, a primary objective of the present invention is the provision of a tool and method for safely and economically removing underground asbestos-containing pipe.

Another objective of the present invention is the provision of a tool and method for handling and disposing of asbestos-containing pipe which is a viable alternative to current EPA requirements.

A further objective of the present invention is the provision of a tool having an internal guide head with cutting elements for breaking up material inside the old pipe and a second set of cutting elements for breaking or grinding the old pipe into pieces.

A further objective of the present invention is the provision of a method for safely replacing old, asbestos-containing pipes with new non-asbestos pipes.

Still another objective of the present invention is the provision of a method for removing underground asbestos-containing pipes and encapsulating the hazardous asbestos materials for safe and easy disposal.

These and other objectives will become apparent from the following description of the invention.

BRIEF DESCRIPTION OF THE DRAWINGS AND PHOTOGRAPHS

DESCRIPTION OF THE INVENTION

Figure 1:
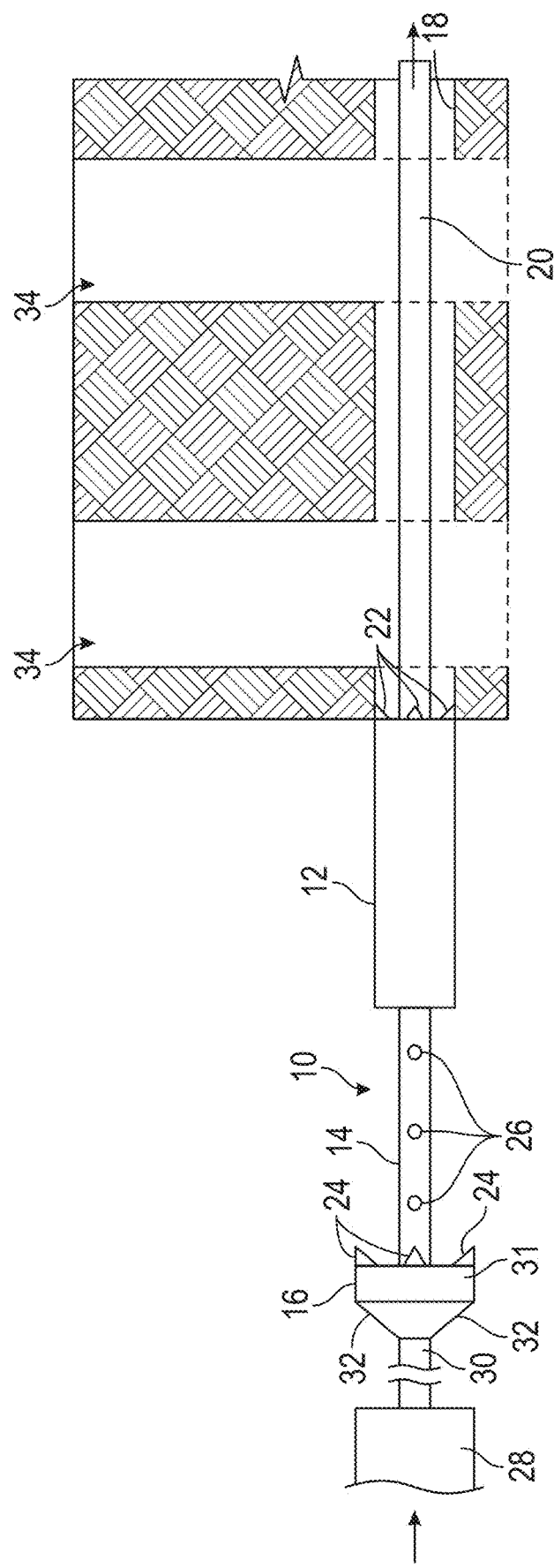
FIG. 1 is a sketch showing use for the tool in removing asbestos-containing pipe.
Figure 2:
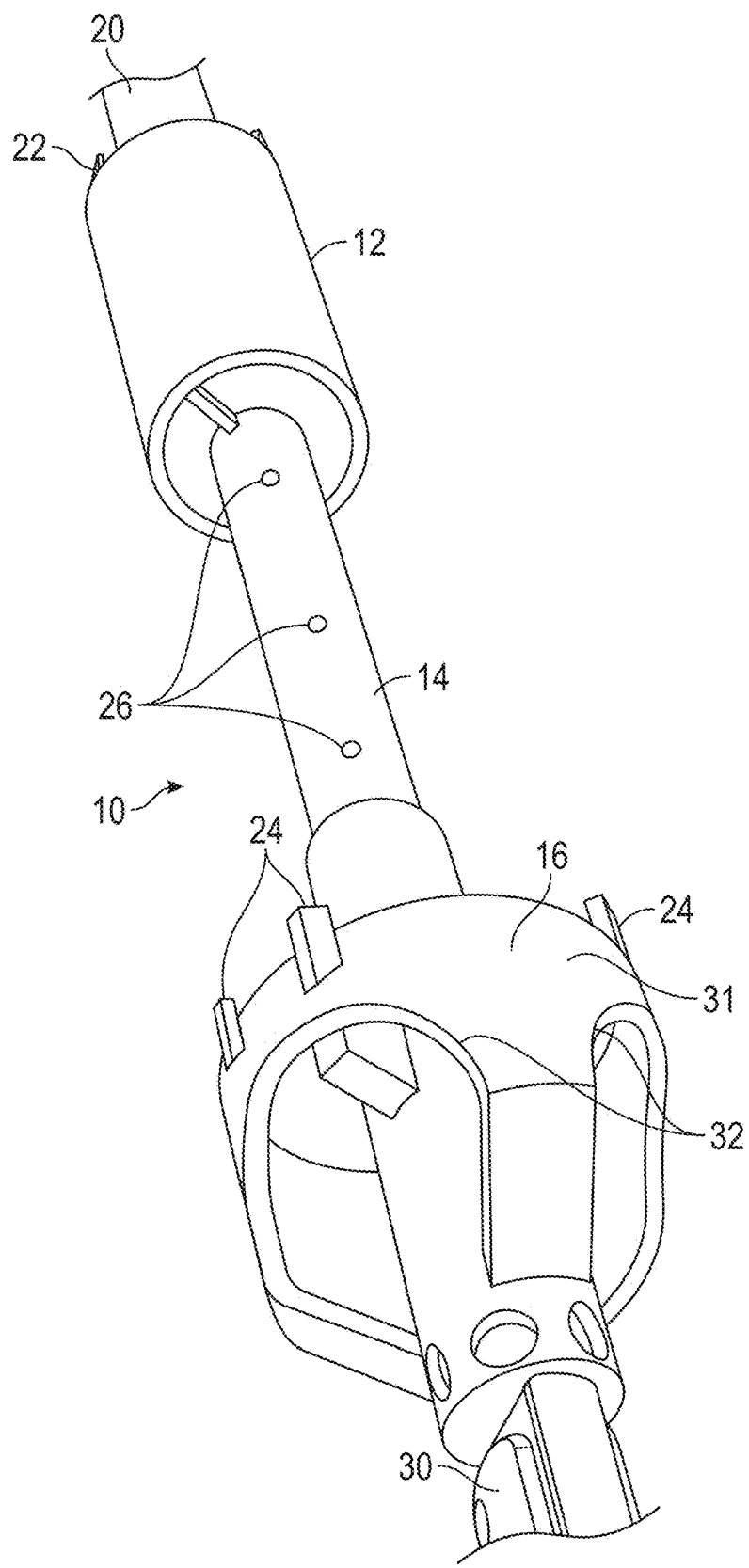
FIG. 2 is a perspective view of the tool.

The tool of the present invention is generally designated by the reference numeral 10, and includes three components: the guide head 12, the connecting shaft 14, and the reamer head 16. The shaft 14 extends between the guide head 12 and the reamer head 16. The tool 10 is intended for use in reaming out underground pipes 18, and particularly, pipes containing asbestos. The tool is rotated by a remote motor (not shown). The rotational speed of the tool 10 needs to be sufficiently high to finely grind the existing pipe 18 to create a good quality slurry that reactivates the cement material present in the existing asbestos-cement pipe 18. The guide head 12 has an outside diameter which is slightly less than the inside diameter of the pipe 18, such that the guide head 12 can be pulled through the pipe 18 by a pulling shaft or cable 20. The motor is operatively connected to the shaft 20 and may be located in a work pit or above ground. The forward end of the guide head 12 may have cutting elements 22, such as knives, to clean obstructions and debris from the interior of the pipe 18, so that the tool 10 can move through the pipe.

The reamer head 16 has an outside diameter which is slightly greater than the outside diameter of the pipe 18. The reamer head 16 has the plurality of cutting elements 24 on the forward end which were adapted to grind, ream, and otherwise break up the pipe 18 as the reamer head 16 is pulled along the pipe 18 by the pulling shaft 20.

The connecting shaft 14, which follows the guide head 12 into the pipe 18, has a plurality of holes 26 which allow liquid to be sprayed or ejected from the interior of the shaft 14 onto the inside wall of the pipe 18. The reamer head 16, which follows the shaft 14, grinds or breaks the pipe 18 into pieces to mix with the liquid from the shaft 14. As the pipe 18 is ground and broken up by the reamer head 16, the liquid from the ejection ports 26 of the shaft 14 creates a flowable mass or slurry with the pipe pieces.

A new pipe 28 follows the reaming head 16, and is connected thereto by a shaft 30, or alternatively, by a cable (not shown). The reamer head 16 is hollow and has an outer ring 31 with openings 32 which allow the slurry of liquid and pipe pieces to pass thereto. The slurry is forced upwardly by the new pipe section 28 through bored relief holes 34 as the new pipe section 28 is pulled through the longitudinal bore formed by the reamer head 16. Preferably, there are a plurality of relief bores 34 extending downwardly from the ground surface to the pipe 18 and along the length of the pipe 18. The bore holes 34 are preferably, but not necessarily, vertically oriented, and have a diameter sufficient to allow the slurry mixture or mass to flow upwardly out of the holes 34.

A drying agent, such as Portland cement powder, fly ash, or other powders, is mixed with the slurry, which is then allowed to dry into a solid mass, and thereby encapsulate the asbestos. The encapsulated, solid material thus is prevented from becoming airborne, and flowing into the soil or water table. The hardened material can be disposed at a landfill, without the hazardous asbestos becoming a health issue.

The close tolerance between the guide head 14 and the inside of the pipe 18 allows the reamer head 16 to be pulled through in a controlled manner. Similarly, the close tolerance between the new pipe 28 and the bore formed by the reamer head 16 minimizes the annular space around the new pipe 28 during installation.

The pulling shaft 20 is rotated by the motor as it is pulled through the pipe 18, in the direction indicated by the arrows in FIG. 1, such that the guide head 12 and reamer head 16 are rotated, such that the cutting elements 22, 24 are functional. Grinding of the pipe 18 in front of the reamer head 16 prevents the ground asbestos from becoming airborne, since the ground pipe is not in an open ditch. The liquid supplied from the shaft 14 via the ports 26 also prevents the asbestos from becoming airborne. The liquid and broken pipe slurry is easily removed from the ground, as forced upwardly through end excavation pits or through the relief holes 34, in a path of least resistance, and in a controlled manner, which allows for greatly simplified disposal of the hazardous waste after the slurry has solidified.

The tool 10 of the present invention and the method of use of the tool 10 eliminates the requirement for a ditch and the manual handling of the asbestos pipe, as in the prior art. Thus, the tool 10 and process provides a safe and economical means for disposing of the hazardous pipe material.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A method for removing an underground asbestos-containing pipe, comprising:
    forming holes downwardly from a ground surface to the pipe;
    pulling a cutting tool through the pipe, the tool having a guide head, a reamer head, and a hollow shaft extending between the guide head and the reamer head;
    supplying liquid to the hollow shaft and ejecting the liquid outwardly through ports in the hollow shaft into the pipe;
    breaking the pipe into pieces with the reamer head as the cutting tool is pulled through the pipe to form a slurry of the liquid and the pipe pieces;
    removing the slurry through the holes;
    adding a drying agent to the slurry to form a mass; and
    allowing the mass to dry to a hardened state.

2. The method of claim 1 wherein the guide head fits within the pipe.

3. The method of claim 1 wherein the guide head has an outside diameter which is minimally less than the pipe inside diameter.

4. The method of claim 1 wherein the reamer head has an outside diameter which is minimally larger than the pipe outside diameter.

5. The method of claim 1 wherein the asbestos is encapsulated in the hardened mass.

6. A method of replacing an old pipe with a new pipe; comprising:
    forming bores from a ground surface downwardly to the old pipe;
    pulling a guide head into the old pipe,
    pulling a reamer head behind the guide head, and the reamer head having cutting elements defining a diameter at least equal to a diameter of the old pipe;
    rotating the reamer head so that the cutting elements break the old pipe into pieces;
    ejecting a liquid to mix with the pipe pieces to form a slurry;
    evacuating the slurry through the bores to the ground surface; and
    pulling a new pipe behind the reamer head.

7. The method of claim 6 wherein the slurry evacuation creates a void into which the new pipe is pulled.

8. The method of claim 6 further comprising a shaft between the guide head and the reamer head and having holes for ejection of the liquid from the shaft.

9. The method of claim 6 further comprising adding a drying agent to the slurry.

10. The method of claim 6 further comprising allowing the slurry to harden into a mass and then disposing of the mass.

11. A cutting tool for breaking up underground asbestos-containing pipe, comprising:
    a guide head;
    a reamer head;
    a hollow shaft extending between the guide head and the reamer head; and
    the shaft having holes for discharging a liquid.

12. The cutting tool of claim 11 wherein the guide head has an outside diameter which is minimally less than the pipe inside diameter and has cutters to remove internal debris in the pipe.

13. The cutting tool of claim 11 wherein the reamer head has an outside diameter which is minimally larger than the pipe outside diameter.

14. The cutting tool of claim 11 wherein the reamer head has a stabilizing ring.

15. The cutting tool of claim 11 wherein the reamer head is hollow.

16. The cutting tool of claim 11 wherein the reamer head has openings for passage of broken pipe pieces and liquid.

17. The cutting tool of claim 11 wherein the guide head is hollow to allow slurry pressure relief.

18. The cutting tool of claim 11 further comprising a pull shaft to pull the guide head, the shaft, and the reamer head through the pipe.

19. The cutting tool of claim 11 wherein the reamer head has a plurality of perimeter cutting teeth.

20. The cutting tool of claim 11 wherein the reamer head has a diameter minimally greater than the pipe outside diameter.

* * * * *